(12) United States Patent
Millington et al.

(10) Patent No.: US 6,360,167 B1
(45) Date of Patent: Mar. 19, 2002

(54) VEHICLE NAVIGATION SYSTEM WITH LOCATION-BASED MULTI-MEDIA ANNOTATION

(75) Inventors: Jeffrey Alan Millington, Rochester Hills; Larry E. Spencer, II, Lake Orion; Donald J. Long, Sterling Heights; Richard Eklund, Rochester; Michael G. Lambie, Lake Orion, all of MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/239,692

(22) Filed: Jan. 29, 1999

(51) Int. Cl.$^7$ .......................... G01C 21/00; G01C 21/26
(52) U.S. Cl. .................. 701/211; 701/207; 701/208; 701/213; 342/357.06; 342/357.13
(58) Field of Search ................ 342/357.01–357.17; 701/207–216

(56) References Cited

U.S. PATENT DOCUMENTS

| | | | |
|---|---|---|---|
| 4,951,212 A | 8/1990 | Kurihara et al. | |
| 4,973,952 A | 11/1990 | Malec et al. | |
| 5,353,034 A | 10/1994 | Sato et al. | 342/457 |
| 5,470,233 A | 11/1995 | Fruchterman et al. | |
| 5,499,181 A | 3/1996 | Smith | |
| 5,559,707 A | 9/1996 | DeLorme et al. | |
| 5,627,549 A | 5/1997 | Park | |
| 5,664,948 A | 9/1997 | Dimitriadis et al. | |
| 5,682,525 A | 10/1997 | Bouve et al. | |
| 5,802,492 A | 9/1998 | DeLorme et al. | |
| 5,887,269 A | * 3/1999 | Brunts et al. | 701/208 |
| 5,938,721 A | * 8/1999 | Dussell et al. | 701/211 |

FOREIGN PATENT DOCUMENTS

| | | | |
|---|---|---|---|
| DE | 4033326 A1 | * | 4/1991 |
| EP | 0875729 | | 11/1998 |
| FR | 2691276 | | 11/1993 |
| FR | 2743168 | | 7/1997 |
| JP | 8-76706 | * | 3/1996 |
| JP | 8-138193 | * | 5/1996 |
| JP | 8-190574 | * | 7/1996 |
| JP | 9-288445 | * | 11/1997 |
| JP | 9-329449 | * | 12/1997 |

* cited by examiner

*Primary Examiner*—Bernarr E. Gregory
(74) *Attorney, Agent, or Firm*—Carlson, Gaskey & Olds

(57) ABSTRACT

A navigation system provides multimedia annotations based upon the present location of the vehicle. These presentations may comprise advertising or text or other information entered by the user and associated with a specific location or locations. The navigation system also provides a removable media reader which obtains additional information based upon which the navigation system operates. This additional information may include multimedia annotations which are location-based. The navigation system further includes a wireless communication system which interacts with and provides further location-based multimedia annotations.

44 Claims, 3 Drawing Sheets

VEHICLE NAVIGATION SYSTEM WITH LOCATION-BASED MULTI-MEDIA ANNOTATION

BACKGROUND OF THE INVENTION

The present invention relates generally to vehicle navigation systems.

Current vehicle navigation systems may include a variety of position determining devices, such as GPS receivers, accelerometers, gyros, speedometers, compasses, etc. in order to determine the position of the vehicle relative to a database of roads. As is well-known, a user selects a destination in the database of roads and the navigation system guides the user along the roads to the destination. The known navigation systems permit the user to select a destination by category. For example, the user can select the category of "restaurants" at which point restaurants in a selected area or the closest restaurants will be displayed. Upon selection of the desired restaurant, the navigation system will guide the user via the roads in the database to the destination. Currently, only the name of the restaurant is displayed, without any additional information. Thus, the user's decision about which restaurant to select must be based completely on the name of the restaurant. This is particularly difficult for the user in an unknown area selecting among restaurants other than national franchises.

Some current navigation systems guide the user to the destination via turn-by-turn instructions. Many users of vehicle navigation systems are travelers from out of town (and sometimes from out of the country) who are renting a vehicle in an area where they are unfamiliar with the roads and surrounding points of interest. Travelers from out of the country may understand little or none of the audible instructions originally installed in the navigation system because they are in a language other than their own, thus diminishing the value of the audible instruction.

Currently, it is impractical for rental car agencies to remove or disable permanently installed vehicle navigation systems from vehicles for renters who did not request (and pay for) the vehicle navigation system. As a result, potential revenue from rental fees for navigation systems may be lost.

Similarly, some vehicle navigation systems include a database of roads for nine or more geographic areas in the United States; however, typically, only one or a few of these geographic areas are enabled on the system purchased by the consumer, depending upon where the consumer intends to use the system. Thus, although it would be particularly useful, the consumer may be unable to utilize the navigation system in geographic areas to which the consumer may travel only occasionally for vacation.

SUMMARY OF THE INVENTION

These and other drawbacks of known navigation systems are overcome by the navigation system of the present invention. The present invention provides a vehicle navigation system with location-based multimedia annotations (text, graphics and/or audio) in several different ways. First, "ads" comprising location-based multimedia annotations are periodically presented. These ads are presented based upon the current location of the vehicle relative to a location with which the ad is associated. Some ads are displayed at power-up independent of vehicle location, as will be explained below. The user also has the ability to request additional information associated with the ad. The additional information may be stored on the database of the navigation system, read by a removable media reader connected to the navigation system or received via a wireless communication system on the vehicle. This additional information may include text, graphics, audio and/or multimedia presentations which relate to the ad selected by the user.

The navigation system of the present invention further provides a removable media reader which reads information from a removable media and provides that information to the navigation system, which operates based upon that information. For example, the removable media may include prestored routes, destinations, and additional location-based multimedia annotations. The navigation system of the present invention also provides a wireless communication system which provides the ads and the additional information to the navigation system and its user. The ads may be utilized to help defray the cost of the navigation system to the purchaser or user.

The removable media may also include audio data, such as audible turn instructions in a language other than that previously stored on the navigation system. The removable media may also include a code or codes which enable the navigation system or at least some functions of the navigation system. The code may be time specific, such that it only enables the system for a predetermined time period, or it may be geographically specific, such that it enables the navigation system to access additional geographic areas in its database. Alternatively, the code may be entered via the user input device.

It should be noted that there are many inventive features described here, many of which could be practiced alone, or in different combinations with the others as described. Those of reasonable skill in the art could determine ways of practicing any one or any combination of these features, which would still be considered part of the present invention.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
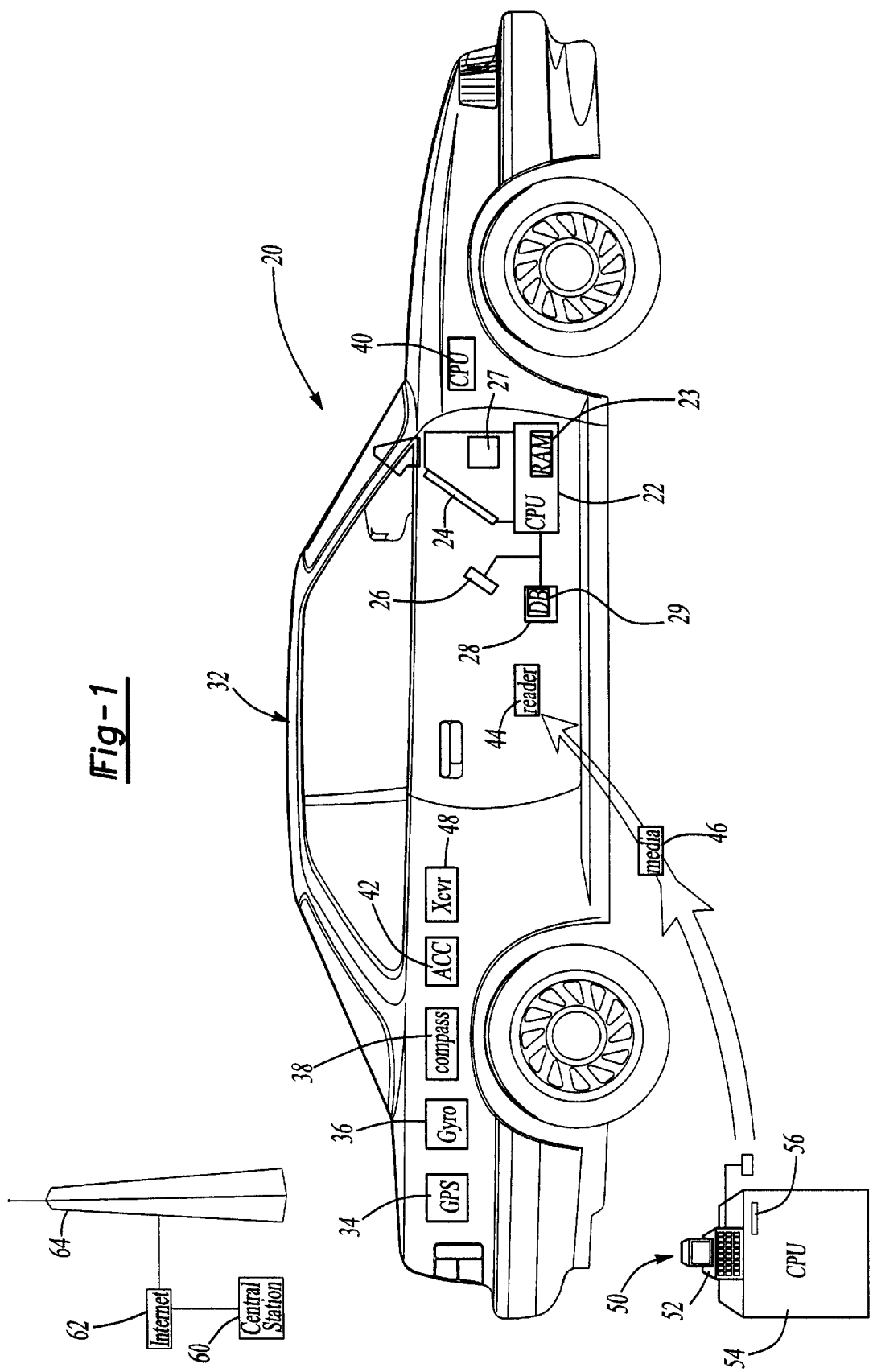
FIG. 1 is a schematic of the navigation system of the present invention installed in a vehicle.

The navigation system 20 of the present invention is shown schematically in FIG. 1. The navigation system 20 includes a CPU 22 having RAM 23 and connected to a display 24, such as a high resolution LCD or flat panel display. The CPU 22 is also connected to an input device 26 such as a mouse, keyboard, key pad, remote device or microphone.

The user input device 26 is preferably a keypad comprising a plurality (preferably eight) of direction arrows which operate together with the display 24 to enter text, numbers, symbols, etc. or other alphanumeric characters. Preferably, the characters are entered utilizing the character entry system disclosed in co-pending application U.S. Ser. No.

09/096,103 entitled "A NAVIGATION SYSTEM CHARACTER INPUT DEVICE" filed on Mar. 10, 1998, which is hereby incorporated by reference. Alternatively, the display 24 can be a touch screen display.

The CPU 22 also includes at least one audio speaker 27 outputting sound from the CPU 22. The navigation system 20 further includes a storage device 28, such as a hard drive 28 and/or CD ROM, connected to the CPU 22. The storage device 28 contains a database 29 including a map of all the roads in the area to be traveled by the vehicle 32 as well as the locations of potential destinations, such as addresses, hotels, restaurants, or previously stored locations. The software for the CPU 22, including the graphical user interface, route guidance, operating system, position-determining software, etc may also be stored in storage device 28 and/or in the RAM 23 or alternatively in ROM or flash memory.

The navigation system 20 preferably includes position determining devices, such as a GPS receiver 34, a gyroscope 36, a compass 38, a wheel speed sensor 40 and a multi-axis accelerometer 42, all connected to the CPU 22 (connections not shown for simplicity). Suitable position and motion determining devices are well known and are commercially available.

As is well known, the position determining devices determine the position of the vehicle 32 relative to the database of roads utilizing dead-reckoning, map-matching, GPS, etc. Further, as is known in navigation systems, the user can select a destination relative to the database 29 of roads utilizing the input device 26 and the display 24. The navigation system 20 then calculates and displays a recommended route directing the driver of the vehicle 32 to the desired destination. Preferably, the navigation system 20 displays turn-by-turn instructions on display 24 along with corresponding audible turn-by-turn instructions via speaker 27, guiding the driver to the desired destination. The navigation system 20 stores turn-by-turn and other instructions and phrases in several different languages in the storage 28 and/or RAM 23.

The navigation system 20 further includes a removable media reader 44 connected to the CPU 22 for reading a portable, removable storage media 46, such as a floppy disk, a CD ROM, a card with a magnetized strip or a bar code, a memory chip (such as RAM, ROM, EEPROM, etc), or any other magnetic, electronic, or optical or other storage media. The reader 44 sends data from media 46 to the CPU 22.

As will be described in more detail below, the programmed (or pre-programmed) removable storage media 46 includes data which is used by the navigation system 20 in its operation and/or a code or codes which enable one or more functions of the navigation system 20. The removable media 46 includes data utilized by the navigation system 20, such as pre-stored routes, destinations, guided multimedia tours (explained below) or additional information regarding the routes or destinations or points of interest along the route. The removable media 46 further includes an indicator of which of the previously stored languages the navigation system 20 should use to generate the audible turn-by-turn instructions or, if necessary, also include the audio data, for generating the audible route guidance and other instructions in a human language other than those previously stored on CPU 22, such as German, French, Spanish, Japanese, etc.

At a location remote from the vehicle 32 is a programming station 50 including an input device, such as a keyboard and/or mouse 52, but alternatively including a touch screen display, microphone, keypad, etc. The programming station 50 further includes a CPU 54 including or connected to a removable storage media writer 56 for writing information to the removable storage media 46. The CPU 22 and CPU 54 include appropriate software programmed to perform the functions described herein. One of reasonable skill in the art would be able to create the necessary programming for the CPUs 22, 54 to operate and perform these functions.

The programming station 50 is capable of selectively writing (or enabling) all of the information described above on the removable media 46 as determined by the user input device 52 and CPU 54. Alternatively, some removable media 46 may be preprogrammed to incorporate some or all of the above information. The programming station 50 is preferably located at a rental car agency, at which the vehicle 32 is one of the rental cars available. Via a graphical interface at the programming station 50, the operator can selectively add data to the removable data 46 of the types described above. The operator can select via the input device 52 a language for the audible instruction data, the time period or dates for the navigation system 20 to be enabled, the geographic areas for which to enable the navigation system 20, predetermined routes, points of interest and/or destinations to be traveled by the driver of the vehicle 32. The data may include additional information, including audible and/or multimedia annotations regarding points of interest and/or destinations along an intended route. The data may further include routes and multimedia annotations for guided multimedia tours.

Similar or identical programming stations 50 may also be provided at selected locations convenient to consumers. Alternatively, programming stations 50 may be located at a central location accessible via the telephone or Internet in which case the removable media 46 could be shipped to the user's location. The programming station 50 could alternatively be a user's home computer in which case the additional data could be obtained via the Internet or via a remote connection.

The navigation system 20 further includes a transceiver 48, such as (or similar to) a cellular phone, PCS, satellite phone, RF, microwave or other wireless communication system. The transceiver 48 is connected to the CPU 22 which includes the appropriate communication software, such as Internet software. The transceiver 48 communicates with a plurality of complementary transceivers 64 (one shown) such as cell towers or a satellite. The transceiver 64 is connected via telephone lines, wireless links (such as cell towers or satellites), and/or the Internet to an Internet server 62 which in turn is connected via telephone lines, wireless link and/or the Internet to a central station 60, generally comprising a CPU, preferably with graphical user interface and mass storage (not shown). In general, information is exchanged between the central station 60 and the navigation system 20 via the transceivers 64, 48. Details of the information exchanged will be described below; however, one of ordinary skill in the art could provide the appropriate software to implement the functions described.

Figure 2:
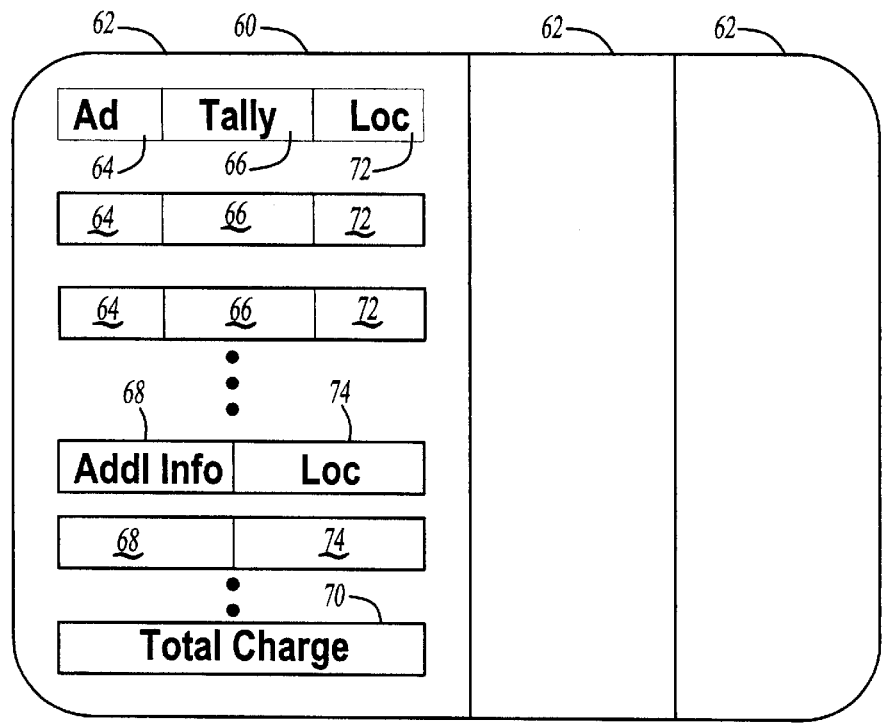
FIG. 2 is a schematic representation of the central station of FIG. 1.

Referring to FIG. 2, central station 60 stores a plurality of accounts 62, each having a plurality of associated ads 64, which comprise multimedia annotations (such as text, graphics, audio, MPEG (or similar), or other multimedia files). Each of the ads 64 is associated with an account 62 corresponding to an advertiser. Each advertiser may be associated with a plurality of ads 64. Each ad 64 may be further linked to additional information 68 regarding the advertiser. For example, a restaurant may include as additional information 68 its menu, prices, etc.

Each ad 64 is associated with a tally 66 indicating the number of times the ad 64 was displayed and the number of times the additional information 68 is accessed. Preferably, the central station 60 also tracks the average amount of time each ad is displayed, number of times the user was routed to the ad''associated destination after seeing the ad 64 and other statistical information. Each ad 64 (within an account) may be associated with the same, some of the same, or different additional information 68. There need not be an exclusive one-to-one association between the ads 64 and the additional information 68. Only a few ads 64 and additional information 68 are shown; however, many more would be used. Preferably, the ads 64 are associated only with information associated with the same account 62, i.e., preferably ads 64 in one account 62 are not associated with additional information 68 in a different account 62.

Each account 60 further includes a charge 70 indicating an amount to charge an advertiser associated with the account 62 based, at least in part, on the tallies 66. For example, there may be a fixed fee for each tally 66. The field 70 represents the total charge associated with that advertiser account 62 for providing the advertising service. Periodically, central station 60 transmits the field 70 to the associated advertiser for payment. Each ad 64 also includes location information 72, which may comprise a plurality of locations. Alternatively, or in addition, the additional information may include location information 74, which again could include multiple locations.

Figure 3:
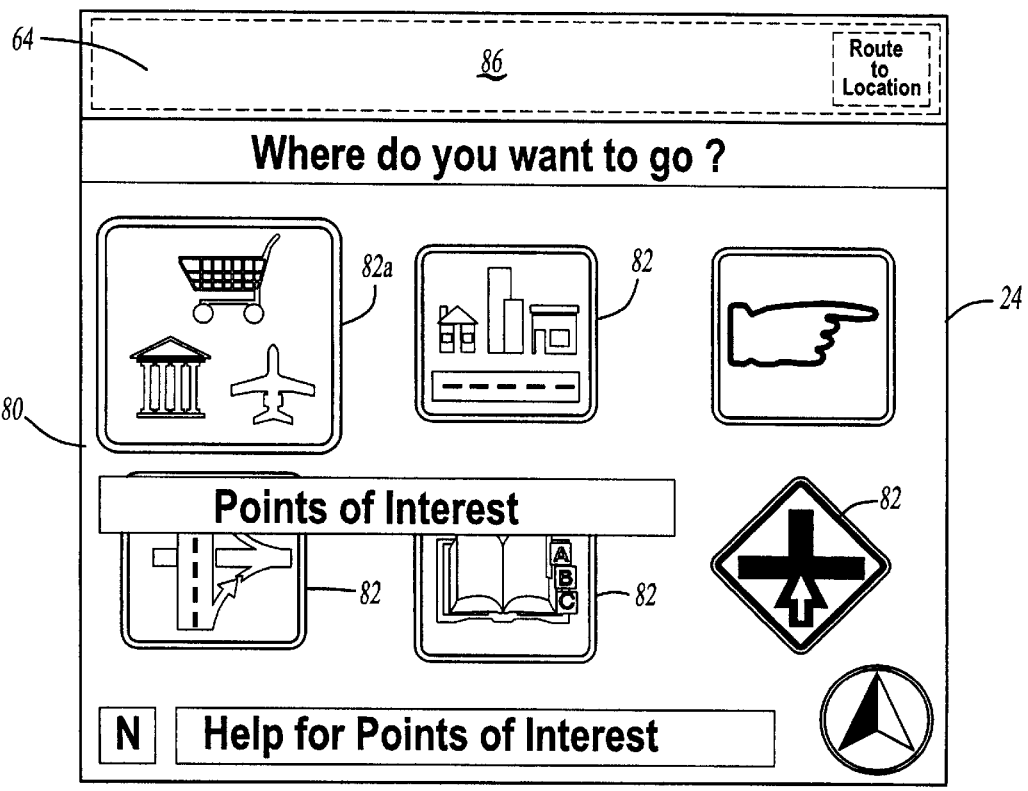
FIG. 3 is a first screen which is displayed on the display of FIG. 1.

A first screen 80 to be displayed on the display 24 is shown in FIG. 3. The first screen 80 includes a plurality of icons 82 which may be selected by the user utilizing the input device 26 (FIG. 1). Each of the icons 82 is associated with a plurality of pre-stored destinations stored in database 29 or options for entering destinations. Icon 82a (shown selected) is associated with "points of interest." Screen 80 further includes an ad portion 86 in which ads stored on CPU 22 and/or storage 28 are displayed periodically. These are the ads 64 from the central station 60 (FIG. 2) or stored locally on the mass storage 28. The first screen 80 displays only ads 64 associated with a location 72 (FIG. 2) within a predetermined distance from the current location of the vehicle 32 as determined by the navigation system 20. A startup screen also displays ads 64 which are locally stored on the mass storage 28. Statistical usage information as described above may also be kept by the navigation system 20 and periodically sent to the central station 60. The user can also select to be routed (via turn-by-turn instructions) to the location associated with any ad 64, such as the location of the restaurant, etc.

Utilizing the input device 26, the user can select the currently displayed ad 64, (which is a multimedia annotation) to obtain additional information 68 associated with the ad 64. Preferably, the additional information 68 would occupy most or all of the screen 24. Upon request for additional information 68, the transceiver 48 indicates to the central station 60 (via 64, 62) that the additional information 68 has been requested. The central station 60 then increments the associated tally 66 and updates the total charge 70 associated with the account 62. If the additional information 68 associated with the ad 64 is not already stored on CPU 22 or storage 28, the transceiver 48 sends a request to the central station 60, which then transmits, via transceiver 48, the additional information 68.

The additional information 68 may comprise text, graphics and/or multimedia presentations associated with the ad 64. For example, for an ad 64 associated with a restaurant, the additional information 68 may comprise menu, prices or other additional information. The additional information 68 presented based upon a request in response to a selected ad 64 may also depend upon the current location of the vehicle 32 as determined by the vehicle navigation system 20. Different additional information 68 may be presented based upon the current location of the vehicle 32 by comparing the current location of the vehicle to the location information 74 associated with the additional information 68.

Alternatively, the CPU 22 and/or storage 28 may store additional information 68, particularly previously retrieved additional information 68. The CPU 22 and/or storage 28 may also temporarily keep usage information such as number of times the ads 64 are each displayed, number of accesses to the information 68, viewing time for each ad 64, average viewing time for ads 64, whether the user was actually routed to the location associated with the ad 64 after seeing the ad 64 and other statistical usage information. This information is periodically transmitted to the central station 60 via the wireless links, or via the removable media 46 (particularly in the context of a car rental agency).

Figure 4:
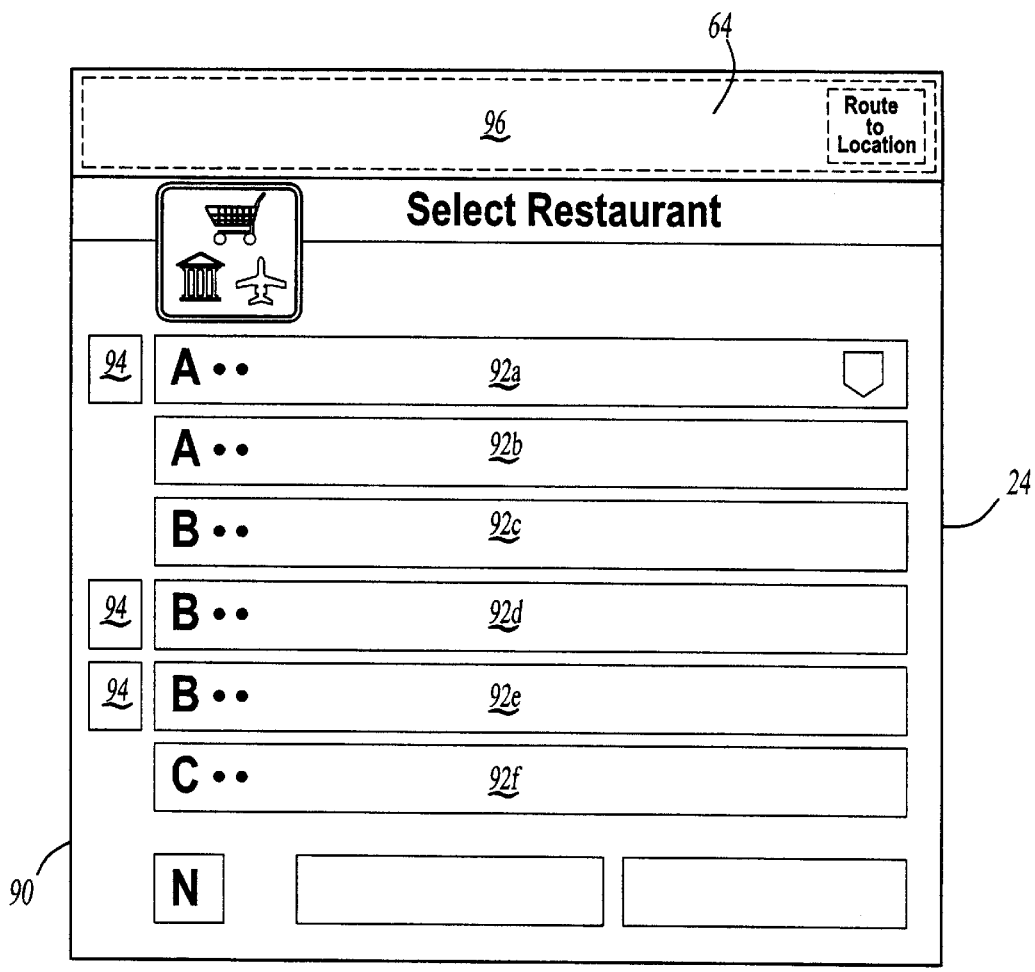
FIG. 4 is a second screen which is displayed on the display of FIG. 1.

Upon selection of the points of interest icon 82a in FIG. 3, the user would be presented with a list of selections for types of points of interest, such as airports, gas stations, restaurants, etc., as is known. Upon selecting a type of points of interest, such as "restaurant" a second screen 90 is displayed on display 24, as shown in FIG. 4. Names of specific points of interest (in this example, restaurants) are displayed in name fields 92a–f. More names can be selected by paging the display 24 down. Name fields 92 for which additional information 68 (FIG. 2) is available include such an indication, such as an icon 94 adjacent the name field 92. The second screen 90 also includes an ad field 96 in which the ads 64 are periodically displayed. In the second screen 90, since a type of points of interest has been selected (in this example, restaurants), only ads 64 which are associated with that type of points of interest are displayed in ad field 96. Additional information regarding the displayed ad 64 can be obtained in a manner identical to that described in ad field 86 of a first screen 80 (FIG. 3). The display of the ad 64 is also based upon the current location of the vehicle 32 as determined by the navigation system 20 identical to that described with respect to first screen 80 in FIG. 3. The user can also select to be routed to the location associated with the ad 64.

The navigation system 20 may normally be in a locked mode in which at least one function of the navigation system 20 is disabled. For example, in the locked mode, navigation system 20 may not provide any useful function at all, or the navigation system 20 may provide no indication of the position of the vehicle 32 via the display 24, or the CPU 22 may not determine the position of the system, or other ways in which the navigation system 20 may be rendered disabled or useless. It should be noted that the vehicle 32 itself is not disabled. The vehicle 32 and all of its other functions can be operated normally and safely, without the benefit of the navigation system 20 while the navigation system 20 is in a completely disabled locked mode.

Additionally, the navigation system 20 may include locked modes where only some functions are disabled, but the navigation system still calculates position and provides route guidance information in at least some geographic areas. For example, the database 28 may include a plurality of geographic areas (such as nine) only one or a few of which are normally enabled, such as when the system 20 is initially installed into the vehicle 32. The code in the removable media 46, after being received by CPU 22, enables selected additional geographic areas in the database 28. Alternatively, this code could be entered via the input device 26. Since the navigation system 20 includes its own source for current time, from the GPS receiver 34, the code may enable a geographic area or other function for a limited time. For example, based upon data in the CPU 22, the code, whether received via the input device 26 or the removable media 46, could indicate that the specified geographic area or other function be enabled for a predetermined time period, such as a few days or one week. Alternatively, the code could indicate that the geographic area or other function be enabled from a specified start time and date to a specified ending time and date. Preferably, if the code is entered via the input device 26, the code is an alphanumeric code entered sequentially by the user. The code may indicate directly or indirectly via a look-up table or encrypted algorithm, a start time and/or ending time during which the navigation system 20 or at least one function of the navigation system 20 is enabled. Preferably, each the codes are unique to each navigation system 20, such that a code will only work for a specific navigation system 20, which may be identified by a serial number or other unique identifier.

The operation of the navigation system 20 as it may be utilized in a rental car agency will be described with respect to FIG. 1. The programming station 50 is located at the rental car agency and the vehicle 32 is one of the associated rental vehicles. Preferably the rental car agent programs the removable media 46 at the programming station 50 based upon the renter's requests and needs. The programming station 50 programs the removable media 46 to include the code for enabling the navigation system 20 in any or all of the ways described above. Further, since the user most likely has at least one known intended destination, this destination, or even the entire route, can be stored on the removable media 46. The user may also wish to travel to additional destinations, such as other points of interest, which may also be stored on the removable media 46. For example, the user's hotel, several entertainment venues and the location of the rental car agency at which the programming station 50 is located are stored on removable media 46.

The programming station 50 may also store "tours" on the removable media 46. The tours comprise predetermined routes with a plurality of destinations along the route, such as points of interest. At least some of the points of interest are linked to text, graphic and/or multimedia files relating to that location which are also stored on the removable media 46. The removable media 46 may further include audio data, such as audible route guidance and other instructions in a human language other than that previously stored on CPU 22. It should be understood that the removable media 46 could include any one or any combination or all of this information.

The car rental agent (or user) then takes the removable media 46 to the vehicle 32 and loads it into the reader 44 in a manner appropriate to the specific technology (i.e., CD, DVD, magnetic, etc. as described above). The reader 44 retrieves the code from the removable media 46 and sends it to the CPU 22 for authentication. The CPU 22 evaluates the code and determines whether to enter the enabled mode and what features to enable (for example, which geographic areas). If the code is for a specific time period, the CPU 22 may determine the start time and ending time and verify that the enabled time has begun but has not passed.

If the CPU 22 determines that a valid current code is obtained, the navigation system 20 is enabled. A power up or start up screen is first displayed on the display 24. The start up screen may include an ad 64, which may or may not be based upon the current location of the vehicle 32. Statistical, usage and billing information regarding this ad 64 on the start up screen would be kept by the CPU 22 and/or the central station 60 as described above.

The CPU 22 retrieves a first destination from the removable media 46. If the route to the first destination was not previously stored on removable media 46, the CPU 22 calculates its own route via the database 28 and appropriate route guidance software. The user is then guided to the first destination via turn by turn instructions on the display 24 and speaker 27. The CPU 22 may also retrieve the audio data from the removable media 46 and generate audible turn by turn instructions based upon the audio data, in a language appropriate for the intended user, which may be a language different than that previously stored on the navigation system 20. The user, via the user input device 26 and display 24, may select other prestored routes and/or destinations from the removable media 46. Of course, the user can always choose to utilize the navigation system 20 in the normal, known manner of selecting points of interest, entering addresses, intersections, etc.

When the user chooses to conduct one of the "tours" stored on the removable media 46, the navigation system 20 retrieves the starting point location of the route and first guides the user to the starting point in the normal manner. Alternatively, the user can begin the tour at any point on the tour route. The navigation system 20 then guides the user along the tour route. As the navigation system 20 approaches, reaches or passes selected locations along the tour route, the CPU 22 retrieves text, graphics, audio or other multimedia annotations providing information regarding that location. For example, the tour may guide the user to historical points of interest in the area. The additional information stored on removable media 46 will be provided by the navigation system 20 on display 24 and via audio, information regarding that location, such as historical events or other facts about the location, etc. Each of the multimedia annotations are associated with a location. The CPU 22 presents each multimedia annotation when the current location of the vehicle 32 as determined by the navigation system 20 is the same as, or within a predetermined distance from, the associated location. Each tour route may actually comprise a series of sequentially displayed connected routes, i.e. each destination of one route is an origin for the next route and each destination (or origin) is linked to a multimedia annotation.

The user may also enter information, such as text or audio, via the user input device 26 and associate that information with specific locations. The information and the location or locations with which the information is associated is stored on CPU 22 and/or storage 28. For example, the user may store several "to do" lists and associate these lists each with a location, locations or type of location (e.g., grocery store, customer location, vehicle service station, etc.). Other information entered by the user via the input device 26 could also be associated with a location or locations, for example, contact names, account information, or other information each associated with a customer or account of the user. When the user travels to a location associated with such information, that information is presented to the user. For example, when the user arrives at the customer's location, the display 24 will display the information associated with that customer.

In view of the above descriptions, many variations of the present inventions should be apparent. For example, information from the programming station 50 may also be transmitted to the navigation system 20 via the transceivers 64, 48, or could alternatively be transmitted via a temporarily connected hard wire connection. The programming station 50 and central station 60 could be the same computer. All communication between the CPU 22 and programming station/control station 50,60 could take place via the removable media 46.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for communication information in a vehicle navigation system including the steps of:
   (a) determining a vehicle position relative to a database of roads;
   (b) selecting an ad based upon the vehicle position;
   (c) displaying the selected ad in a first portion of a screen; and
   (d) displaying route guidance information in a second portion of the screen.

2. The method of claim 1, further including the steps of:
   (e) associating each of a plurality of ads, including said selected ad, with at least one of a plurality of categories;
   (f) selecting one of the plurality of categories, wherein said step (b) limits the selection to ads associated with said selected category.

3. The method of claim 1, further including the step of:
   (e) requesting route guidance instructions to a destination associated with said selected ad in response to said step (c); and
   (f) displaying route guidance instructions to said destination in response to said step (e).

4. The method of claim 1, further including the steps of:
   (e) requesting additional information in response to said step (c); and
   (j) displaying additional information associated with the ad displayed on the first portion of the screen in response to said step (e).

5. The method of claim 4, wherein said additional information includes a restaurant menu.

6. The method of claim 4, wherein said additional information is transmitted via a wireless signal.

7. A vehicle navigation system comprising:
   at least one position determining device;
   a processor determining a position of the system based upon data received from said at least one position determining device;
   an output device for indicating the position of the system as determined by the processor;
   an input device connected to the processor, said navigation system including a locked mode in which at least one function of the navigation system is disabled, said navigation system enabling said at least one function upon entry of a code via the input device.

8. The navigation system of claim 7, wherein said input device is a user input device.

9. The navigation system of claim 8, wherein the code is an alphanumeric code entered sequentially by the user input device.

10. The navigation system of claim 7, wherein said at least one function includes a database of roads in a selected first geographic area.

11. The navigation system of claim 10, wherein said navigation system is enabled to access a database of roads in a second geographic area but not said first geographic area when in said locked state.

12. The vehicle navigation system of claim 7, wherein said vehicle navigation system provides no indication of the position of the system via the output device when in said locked mode.

13. The vehicle navigation system of claim 7, wherein said processor does not determine the position of the system when in said locked mode.

14. The vehicle navigation system of claim 13, wherein the vehicle is not disabled in said locked mode.

15. The vehicle navigation system of claim 7, wherein said code enables said vehicle navigation system for a predetermined time period.

16. The vehicle navigation system of claim 15, wherein said code indicates a starting time and an ending time to the navigation system for the enabled state.

17. The vehicle navigation system of claim 7, wherein said code indicates a selected geographic area to be enabled.

18. The vehicle navigation system of claim 7, further including a key which is physically portable relative to the processor, said key communicating said code to said navigation system via the input device.

19. The vehicle navigation system of claim 18, wherein said key indicates specific geographic areas to be enabled.

20. The vehicle navigation system of claim 18, wherein said key indicates a selected time period for the navigation system to be enabled.

21. The vehicle navigation system of claim 18, wherein said key is programmable.

22. The vehicle navigation system of claim 18, wherein said key includes route guidance information.

23. The vehicle navigation system of claim 18, wherein said output device includes a speaker generating audible route guidance instructions, said key further including language data, said language data enabling said navigation system to generate said audible route guidance instructions in an additional language.

24. A vehicle navigation system comprising:
   at least one position determining device;
   a processor determining a position of the system based upon data received from said at least one position determining device and indicating said position of the system;
   removable media storing data; and
   said navigation system operating based upon said data from said removable media.

25. The vehicle navigation system of claim 24 wherein said data includes a plurality of geographic locations.

26. The vehicle navigation system of claim 24 further including a database of roads, said data including a plurality of geographic locations relative to said database.

27. The vehicle navigation system of claim 24 further including a programming computer including a user input device at a location remote from said navigation system, said programming computer storing said data on said removable media based upon input from said user input device.

28. The vehicle navigation system of claim 24 wherein said data includes a code for enabling at least one function of said vehicle navigation system.

29. The vehicle navigation system of claim 28 wherein said at least one function includes a database of roads in a selected first geographic area.

30. The navigation of system claim 28 wherein said vehicle navigation system provides no indication of the position of the system if not enabled.

31. The vehicle navigation system of claim 24 wherein said data includes audible instruction data, wherein said output device provides audible route guidance instructions based upon said audible instruction data.

32. A method for communicating information in a vehicle navigation system including the steps of:
- (a) determining a position of the system relative to a database of roads;
- (b) associating each of a plurality of ads with at least one of a plurality of categories;
- (c) selecting one of the plurality of categories;
- (d) selecting one of said ads associated with said selected category based upon said position; and
- (e) displaying the selected ad.

33. The method of claim 32 flirther including the step of:
sending a signal to a remote location remote from the position indicating the selection made in said step (d).

34. The method of claim 33 further including the step of tallying the selections of each of the plurality of ads at the remote location.

35. The method of claim 34 further including the step of calculating a charge based upon said step of tallying.

36. The method of claim 32 further including the step of determining the time that the ad is displayed.

37. The method of claim 36 further including the step of sending a signal from the remote location to the system altering the display of the ad.

38. The method of claim 37 wherein said step (a) is performed utilizing a user input device associated with the vehicle navigation system.

39. The method of claim 32 further including the step of sending a signal from a remote location to the system indicating that at least one of said ads should not be displayed.

40. A method for operating a vehicle navigation system including the steps of:
- (a) entering information into the vehicle navigation system;
- (b) storing said information on the vehicle navigation system;
- (c) associating the information with at least one geographic location;
- (d) determining a position of the navigation system; and
- (e) recalling the information based upon said steps (d) and (c).

41. A method for communicating information in a vehicle navigation system including the steps of:
- (a) associating each of a plurality of annotations with each of a plurality of locations along a route;
- (b) moving a vehicle along said route;
- (c) determining a position of the vehicle relative to the route and the plurality of locations during said step (b);
- (d) comparing the position of the vehicle as determined in step (c) with the plurality of locations; and
- (e) displaying each of the plurality of annotations based upon said step (d).

42. The method of claim 41 further including the step of:
- (f) storing the route in the navigation system prior to said step (b); and
- (g) guiding the vehicle along the route based upon the determined position of the vehicle as determined in said step (c).

43. The method of claim 42 wherein the route is a tour including at least three of the locations each having an associated one of the annotations.

44. The method of claim 43 wherein the annotations are multimedia annotations.

* * * * *

US006360167C1

(12) EX PARTE REEXAMINATION CERTIFICATE (10403rd)

United States Patent
Millington et al.

(10) Number: US 6,360,167 C1
(45) Certificate Issued: Nov. 14, 2014

(54) VEHICLE NAVIGATION SYSTEM WITH LOCATION-BASED AND MULTI-MEDIA ANNOTATION

(75) Inventors: Jeffrey Alan Millington, Rochester Hills, MI (US); Larry E. Spencer, II, Lake Orion, MI (US); Donald J. Long, Sterling Heights, MI (US); Richard Eklund, Rochester, MI (US); Michael G. Lambie, Lake Orion, MI (US)

(73) Assignee: Beacon Navigation GmbH, Zug (CH)

Reexamination Request:
No. 90/012,272, Apr. 26, 2012

Reexamination Certificate for:
Patent No.: 6,360,167
Issued: Mar. 19, 2002
Appl. No.: 09/239,692
Filed: Jan. 29, 1999

(51) Int. Cl.
*G01S 19/48* (2010.01)
*G01C 21/36* (2006.01)
(52) U.S. Cl.
CPC .................................. *G01C 21/3644* (2013.01)

USPC ................. 701/516; 342/357.31; 342/357.34; 701/408; 701/431

(58) Field of Classification Search
None
See application file for complete search history.

(56) References Cited

To view the complete listing of prior art documents cited during the proceeding for Reexamination Control Number 90/012,272, please refer to the USPTO's public Patent Application Information Retrieval (PAIR) system under the Display References tab.

*Primary Examiner* — Dennis Bonshock

(57) ABSTRACT

A navigation system provides multimedia annotations based upon the present location of the vehicle. These presentations may comprise advertising or text or other information entered by the user and associated with a specific location or locations. The navigation system also provides a removable media reader which obtains additional information based upon which the navigation system operates. This additional information may include multimedia annotations which are location-based. The navigation system further includes a wireless communication system which interacts with and provides further location-based multimedia annotations.

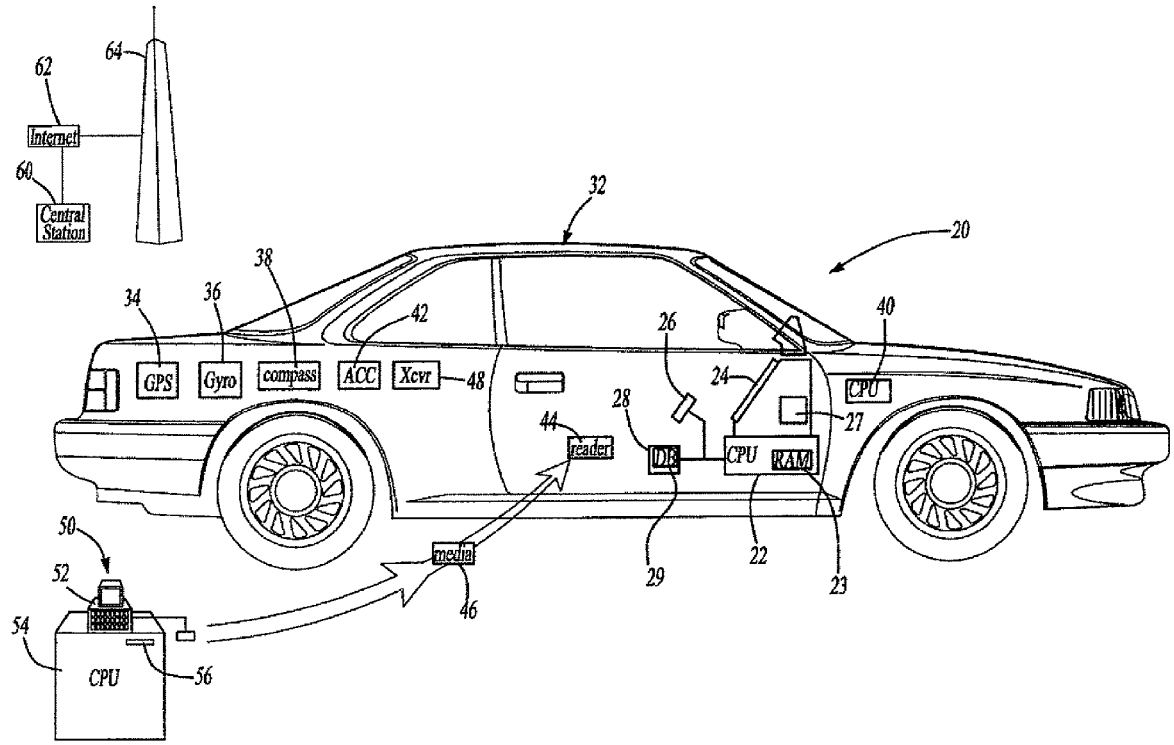

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 32 are cancelled.

Claims 2-31 and 33-44 were not reexamined.

* * * * *